(12) United States Patent
Ehrlinger

(10) Patent No.: US 6,805,648 B1
(45) Date of Patent: Oct. 19, 2004

(54) ELECTRODYNAMIC DRIVE TRAIN

(75) Inventor: Friedrich J. Ehrlinger, Friedrichshafen (DE)

(73) Assignee: ZF Friedrichshafen AG, Friedrichshafen (DE)

(*) Notice: Subject to any disclaimer, the term of this patent is extended or adjusted under 35 U.S.C. 154(b) by 0 days.

(21) Appl. No.: 10/031,358
(22) PCT Filed: Jul. 15, 2000
(86) PCT No.: PCT/EP00/06764
§ 371 (c)(1),
(2), (4) Date: Jan. 17, 2002
(87) PCT Pub. No.: WO01/07278
PCT Pub. Date: Feb. 1, 2001

(30) Foreign Application Priority Data

Jul. 23, 1999 (DE) .......................... 199 34 696

(51) Int. Cl.[7] .............................. F16H 3/72; B60K 1/02
(52) U.S. Cl. ............................................. 475/5; 477/3
(58) Field of Search ...................... 475/5, 207, 218, 475/303

(56) References Cited

U.S. PATENT DOCUMENTS

| 3,077,115 | A | * | 2/1963 | Chapman Jr. ................... 475/5 |
| 5,285,111 | A | * | 2/1994 | Sherman ........................ 475/5 |
| 5,289,890 | A | * | 3/1994 | Toyoda et al. .............. 180/65.8 |
| 5,482,512 | A | * | 1/1996 | Stevenson ....................... 475/5 |
| 5,492,189 | A | | 2/1996 | Kriegler et al. ............ 180/65.2 |
| 5,833,570 | A | * | 11/1998 | Tabata et al. ................... 477/3 |
| 5,846,153 | A | * | 12/1998 | Matsuoka ................... 475/207 |
| 5,846,155 | A | * | 12/1998 | Taniguchi et al. .............. 475/5 |
| 5,856,709 | A | * | 1/1999 | Ibaraki et al. .................. 475/5 |
| 5,875,691 | A | * | 3/1999 | Hata et al. ...................... 475/5 |
| 5,895,333 | A | * | 4/1999 | Morisawa et al. .............. 475/5 |
| 6,440,032 | B1 | * | 8/2002 | Stauber et al. .............. 475/207 |
| 2001/0029220 | A1 | * | 10/2001 | Kato ............................. 477/5 |

FOREIGN PATENT DOCUMENTS

| DE | 25 10 623 | | 9/1976 | ............ B60K/9/00 |
| DE | 32 46 230 | A1 | 6/1984 | ........... B60K/17/00 |
| DE | 195 13 696 | A1 | 10/1996 | .............. H02J/7/14 |
| DE | 197 49 074 | A1 | 5/1999 | ........... B60L/11/02 |
| EP | 0 552 140 | A1 | 7/1993 | ............ B60K/6/04 |
| EP | 0 648 635 | A1 | 4/1995 | ............ B60K/6/04 |
| EP | 0 769 403 | A2 | 4/1997 | ............ B60K/6/04 |
| EP | 0 769 404 | A1 | 4/1997 | ............ B60K/6/04 |
| EP | 0 845 618 | A2 | 6/1998 | ............. F16H/3/72 |

OTHER PUBLICATIONS

"German[-]English Dictionary", http://dict.tu–chemnitz.de, Jul. 31, 2003, search for "shaltgetribe".*

* cited by examiner

Primary Examiner—Roger Pang
(74) Attorney, Agent, or Firm—Davis & Bujold, P.L.L.C.

(57) ABSTRACT

An electrodynamic drive system (2) for a vehicle having, between a drive source (4) and a transmission (16), a planetary gear drive (12) which incorporates three elements, namely, a sun gear (50), an internal gear (10) and a planetary gear carrier (32). A first element (32) is connected to the transmission (16), a second element (10) is connected to the drive source (4) and a third element (50) is bound to at least one electric motor (22), thus an abrasion-free starting element is formed for the vehicle.

8 Claims, 3 Drawing Sheets

ELECTRODYNAMIC DRIVE TRAIN

FIELD OF THE INVENTION

The invention concerns an electrodynamic drive train system for a vehicle.

BACKGROUND OF THE INVENTION

Drive systems for vehicles customarily comprise an internal combustion motor as the driving machine, a subsequent transmission and a friction clutch placed between the internal combustion motor and the transmission or again, comprise a hydrodynamic converter placed between the internal combustion motor and the transmission. The friction clutch or the converter are burdened with losses and present energy losses in the drive train.

The invention has the purpose of minimizing the losses which occur between the driving machine and the transmission.

SUMMARY OF THE INVENTION

In accord with the invention, and with an electrodynamic drive system for a vehicle, it is proposed to place a planetary gear drive between a driving machine and a transmission, which said planetary gear drive encompasses the three elements, sun gear, internal gear, and planetary carrier. Of these three elements, a first element is connected to the transmission, a second element is bound to the driving machine, and a third element is coupled with at least one electric motor. An advantageous construction possesses a control, which can regulate the at least one electric motor in the 4-quadrant operation. A further embodiment possesses a clutch between two elements of the planetary drive for the lockup or bypass of the planetary drive, which in one type of assembly includes a dog clutch. In an additional arrangement, an overtake-free wheeling device is placed between the driving machine and the electrodynamic drive system. In yet another embodiment, several electric motors in combination act upon one of the elements of the planetary drive. In an advantageous embodiment, a lock-up torque converter is provided for the formation of torque support during the startup procedure. This can be carried out by the simultaneous engagement of two shifting stages in the transmission, by means of a parking lock, by a braking apparatus of the vehicle and a simultaneously engaged gear stage on an input shaft of the transmission. In one embodiment form, on one shaft of the planetary drive a brake retard is placed.

By means of the invented drive system, a more environmentally friendly functioning of the vehicle and a lowering of the operating life costs are attained. With the present invention, a drive system is presented, which avoids any friction based starting element. What otherwise would be power lost in slippage, can be now used as a additional power for the electrical on-board system. At the same time, use of the electric motor permits an increase of torque and the motor can be employed as a booster element in the concept of additional drive, during an accelerating period. After the startup phase, the electric motor can be converted to a generator for on-board current supply. The electric motor, in addition, can be employed as a source of power for electrically driven, ancillary power take offs. The use of the electric motor as a starter for the internal combustion motor and as a vehicle drive without the exhaust of environmentally unfriendly substances is a growing technology. At the same time, with corresponding control, as well as in connection with an additional retarding braking system, such as, for example, a hydrodynamic retarder, a damping of interruptions in the drive train can be achieved.

The planetary gear set proposed for the invented drive system can be inserted in front of an optional manual transmission. The following are connected to members of the planetary gear drive:

- the input shaft from the internal combustion motor, if required, with overrunning clutch for start-stop operation or for the Zero-Emission-Vehicle-operation, that is, powering the vehicle by the electric motor, when the internal combustion motor is not turning,
- at least one electric motor, which can operate both as a drive motor as well as a generator,
- if required, a shifting clutch for bypassing the electric motor, when it need not be required as a motor,
- as well as the output shaft to the manual transmission and in some cases, a retarder.

In comparison to conventional drive systems, the following can be eliminated:

- a dry clutch with disengagement means,
- a starter,
- a generator (light machine),
- in some cases, mechanical auxiliary power take-offs,
- partially, one or more mechanical gear stages, because the electrodynamic drive system introduces a corresponding increase of torque.

BRIEF DESCRIPTION OF THE DRAWINGS

The invention will now be described, by way of example, with reference to the accompanying drawings in which.

DETAILED DESCRIPTION OF THE INVENTION

Figure 1:
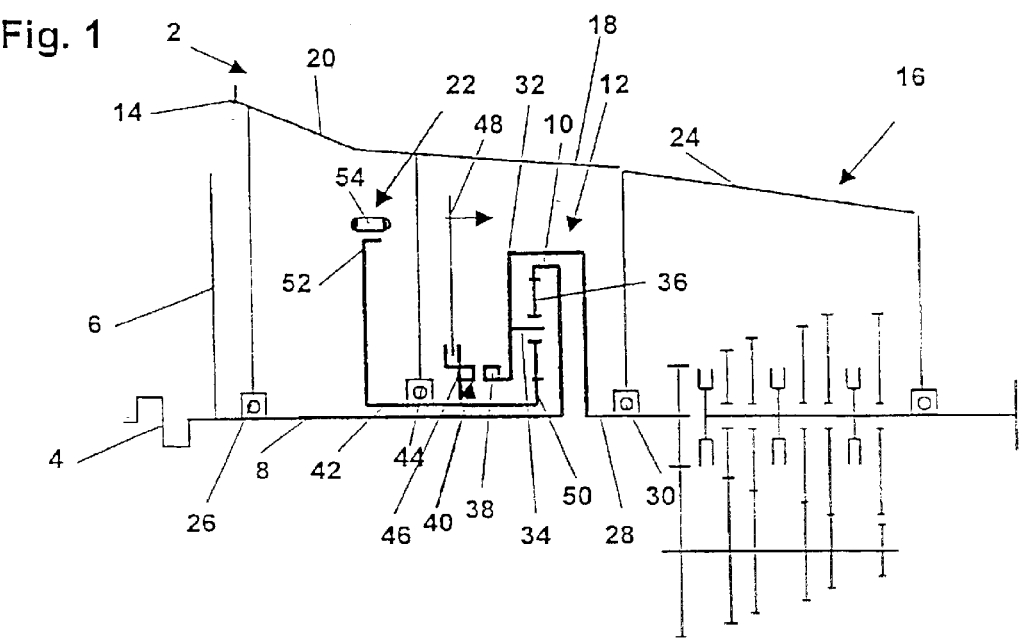
FIG. 1 is a sketch of the principles of the invention.

FIG. 1 presents a sketch of the principles of the invented drive system 2. At the output of a drive source 4, a flywheel 6 is installed, which, by means of a shaft 8, is connected with the internal gear 10 of the planetary gear drive 12. The planetary drive 12 is placed in a part 18 of the housing 14 of a transmission 16. In an additional part 20 of the housing 14, an electric motor 22 is provided. Within yet another part 24 of the housing 14 are located the known elements of a transmission 16, in regard to which, no further discussion is necessary. The parts 18, 20, and 24 can also be separate housing elements combined into an entire housing 14. The shaft 8 is in the part 20 of the housing 14 and rotatably secured in bearings 26. The input shaft 28 of the transmission 16 is likewise rotatably secured in bearings 30 and is affixed to and turns with the planet gear carrier 32 of the planetary gear drive 12. On the bearing bolts 34 of the planetary carrier 32, the planetary gears 36 are rotatably secured. The planetary carrier 32 possesses further a clutch toothing 38 of a torque converter 40, with which the planetary gear carrier 32 is rotatably affixed with a shaft housing 14, also possesses a clutch toothing 46, which, by means of a shifting element 48, can be brought into a rotatingly meshes with coupling toothing 38. Thereby, a bypassing of the planetary gears 12 is achieved. The planetary gears 36 mesh in their toothing both with the internal gear 10 as well as the sun gear 50, which is rotatably affixed with a shaft 42. The shaft 42 possesses in part 18 of the housing 14, the rotor 52 of the electric motor 22. The stator 54 of the electric motor 22 is seated in the housing 14.

Figure 2:
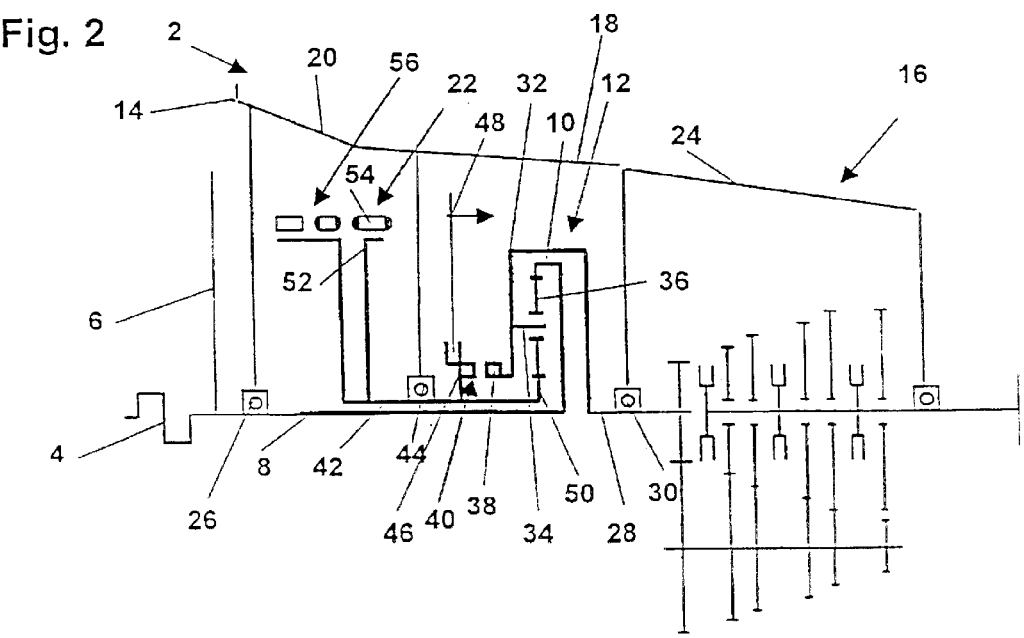
FIG. 2 is an embodiment in accord with FIG. 1 with brake retard system.

FIG. 2 shows the arrangement in accord with FIG. 1, but with an additional brake retard device 56 in the form of a eddy current brake. Corresponding components are designated by the same reference numbers as in FIG. 1.

The rotating part of the eddy current brake 56 are placed on the shaft 42 and the non-rotating elements are secured in part 20 of the housing 14. The brake retard system serves for a abrasion-free braking of the vehicle, especially where long downward inclines are concerned.

FIG. 3 shows again the arrangement of FIG. 1, but with an additional overrunning clutch 58. Corresponding components as in FIG. 1 are designated with the same reference numbers. The rotating elements of the overrunning clutch 58 are placed on the shaft 8 and the non-rotating elements secured in part 20 of the housing 14. The overrunning clutch 58 serves for the drive of the vehicle powered by the electric motor 22, without the necessity that the drive source rotates.

Figure 3:
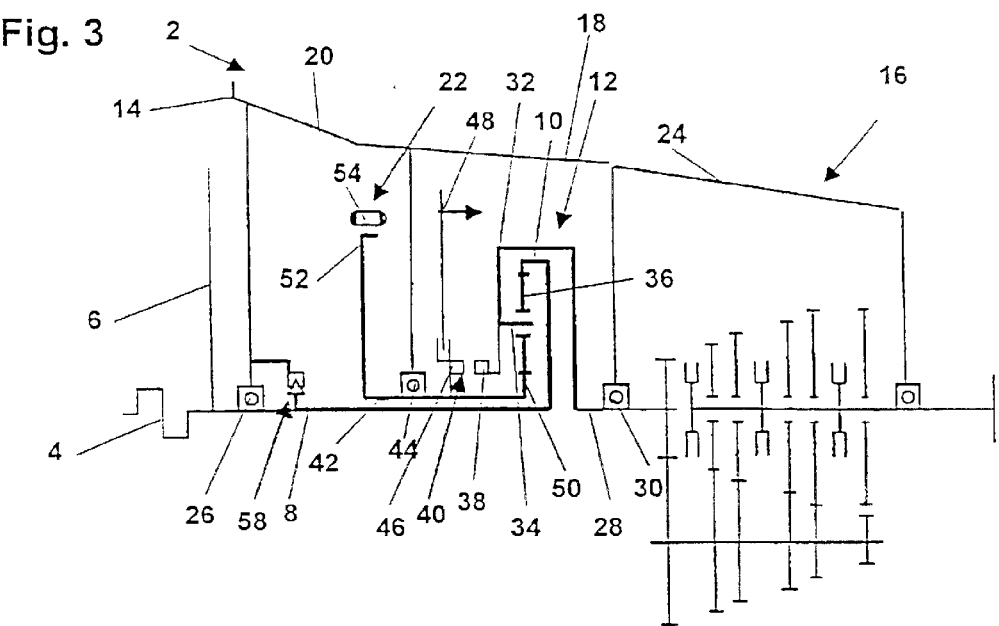
FIG. 3 is an embodiment in accord with FIG. 1 with overrunning clutch.
Figure 4:
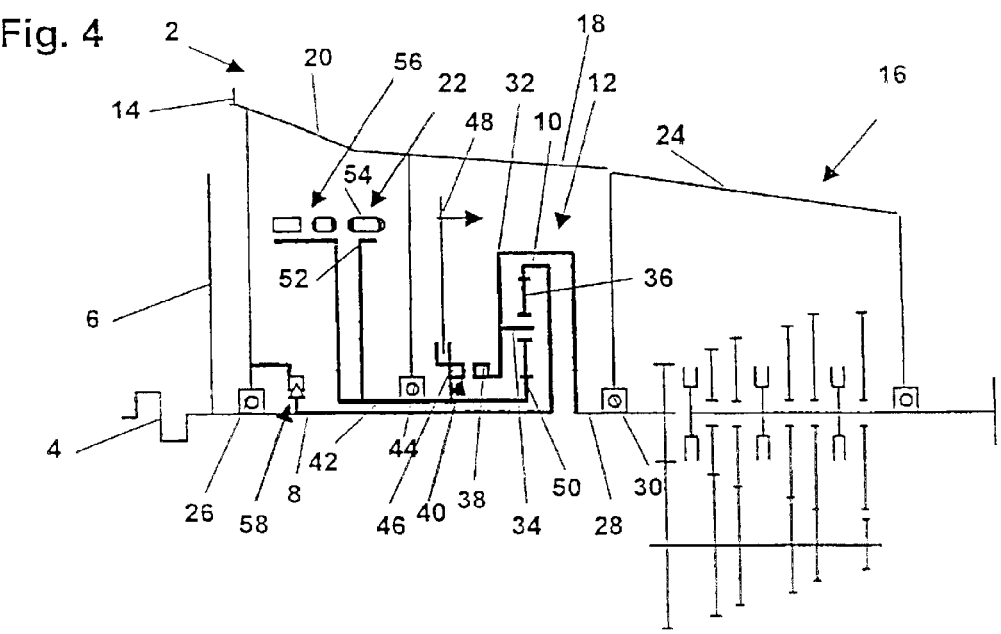
FIG. 4 is an embodiment in accord with FIG. 3 with a retarding brake system.

FIG. 4 presents the arrangement of FIG. 3, with an additional eddy current brake retard clutch 56. Corresponding components in FIG. 4 are designated by the same reference numbers as found in FIG. 3.

Figure 5:
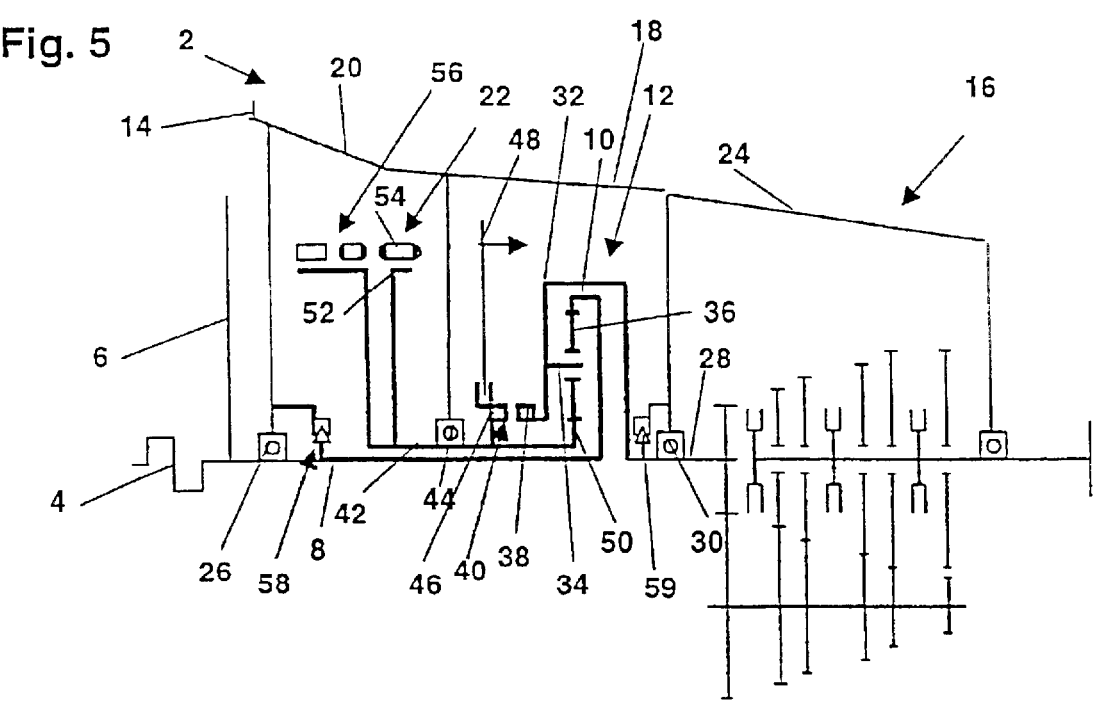
FIG. 5 is an embodiment in accord with FIG. 4 with additional overrunning clutch.

FIG. 5 is shown an assembly with an overrunning clutch 59 on the input shaft 28 of the transmission 16. This overrunning clutch 59 supports the input shaft 28 against a reverse rotation, if, in vehicle stillstand, the drive source 4 is started from the electric motor 22.

Reference Number and Items

2 Drive system
4 Drive source
6 Fly-wheel
8 Shaft
10 Internal gear
12 Planetary gear drive
14 Housing
16 Transmission
18 Housing Part
20 Housing Part
22 Electric motor
24 Housing Part
26 Bearings
28 Input shaft
30 Bearings
32 Planetary carrier
34 Bolts for bearing
36 Planet gear
38 Toothing on gear
40 Bypass clutch
42 Shaft
44 Bearings
46 Clutch toothing
48 Shifting element
50 Sun Gear
52 Rotor
54 Stator
56 Brake retard
58 Overrunning clutch
59 Overrunning clutch

What is claimed is:

1. An electrodynamic drive system (2) for a vehicle located between a drive source (4) and a transmission (16), having a single planetary gear set (12), which includes a sun gear (50), an internal gear (10), a planetary gear (36) and a planetary gear carrier (32), of which the planetary carrier (32) is connected to the transmission (16), the internal gear (10) is connected to the drive source (4) and the sun gear (50) is bound to at least one electric motor (22), with a shift clutch (40) located between the planetary gear carrier and the sun gear (50) and operable to bypass the planetary gear set (12), and a blocking device is provided for torque reinforcement during starting of the drive source (4)

wherein the blocking device is a braking apparatus of the vehicle and a simultaneously engaged gear stage of the shift clutch (40).

2. An electrodynamic drive system (2) for a vehicle located between a drive source (4) and a transmission (16), having a single planetary gear set (12), which includes a sun gear (50), an internal gear (10), a planetary gear (36) and a planetary gear carrier (32), of which the planetary carrier (32) is connected to the transmission (16), the internal gear (10) is connected to the drive source (4) and the sun gear (50) is bound to at least one electric motor (22), with a shift clutch (40) located between the planetary gear carrier and the sun gear (50) and operable to bypass the planetary gear set (12), and a blocking device is provided for torque reinforcement during starting of the drive source (4)

wherein the blocking device is formed by an override clutch (59) on an input shaft (28) of the transmission (16).

3. An electrodynamic drive system (2) for a vehicle located between a drive source (4) and a transmission (16), having a single planetary gear set (12), which includes a sun gear (50), an internal gear (10), a planetary gear (36) and a planetary gear carrier (32), of which the planetary carrier (32) is connected to the transmission (16), the internal gear (10) is connected to the drive source (4) and the sun gear (50) is bound to at least one electric motor (22), with a shift clutch (40) located between the planetary gear carrier and the sun gear (50) and operable to bypass the planetary gear set (12);

a blocking device is provided for torque reinforcement during starting of the drive source (4); and the blocking device is in the transmission (16) and is formed by the simultaneous engagement of two gear stages.

4. An electrodynamic drive system (2) for a vehicle located between a drive source (4) and a transmission (16), having a single planetary gear set (12), which includes a sun gear (50), an internal gear (10), a planetary gear (36) and a planetary gear carrier (32), of which the planetary carrier (32) is connected to the transmission (16), the internal gear (10) is connected to the drive source (4) and the sun gear (50) is bound to at least one electric motor (22), with a shift clutch (40) located between the planetary gear carrier and the sun gear (50) and operable to bypass the planetary gear set (12); and wherein between the drive source (4) and the electrodynamic drive system (2) an overrunning clutch (58) is provided.

5. The electrodynamic drive system (2) for a vehicle according to claim 4, wherein one of an eddy current brake and a hydrodynamic retarder (56) is placed on a shaft (42) of the planetary drive (12).

6. The electrodynamic drive system (2) for a vehicle according to claim 4, wherein a plurality of electric motors (22) on the sun gear (50) act upon the planetary drive (12).

7. The electrodynamic drive system (2) for a vehicle according to claim 4, wherein the shift clutch (40) includes a dog clutch.

8. The electrodynamic drive system (2) for a vehicle according to claim 4, wherein a control is provided, which can regulate the at least one electric motor (22) in 4-quadrant operation.

* * * * *